(12) United States Patent
Justus et al.

(10) Patent No.: US 7,066,258 B2
(45) Date of Patent: Jun. 27, 2006

(54) REDUCED-DENSITY PROPPANTS AND METHODS OF USING REDUCED-DENSITY PROPPANTS TO ENHANCE THEIR TRANSPORT IN WELL BORES AND FRACTURES

(75) Inventors: Donald Justus, Houston, TX (US);
Bradley L. Todd, Duncan, OK (US);
Philip D. Nguyen, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 175 days.

(21) Appl. No.: 10/615,543

(22) Filed: Jul. 8, 2003

(65) Prior Publication Data

US 2005/0006095 A1 Jan. 13, 2005

(51) Int. Cl.
*E21B 43/04* (2006.01)
*E21B 43/267* (2006.01)

(52) U.S. Cl. .................. 166/276; 166/278; 166/280.2; 166/295; 166/300; 428/407; 507/219; 507/220; 507/924

(58) Field of Classification Search ................ 166/281, 166/280.1, 280.2, 276, 300, 295, 278; 428/407; 507/219, 220, 924
See application file for complete search history.

(56) References Cited

U.S. PATENT DOCUMENTS

| | | | |
|---|---|---|---|
| 2,238,671 A | 4/1941 | Woodhouse | |
| 2,703,316 A | 3/1955 | Schneider | 260/78.3 |
| 2,869,642 A | 1/1959 | McKay et al. | |
| 3,047,067 A | 7/1962 | Williams et al. | |
| 3,123,138 A | 3/1964 | Robichaux | |
| 3,176,768 A | 4/1965 | Brandt et al. | |
| 3,199,590 A | 8/1965 | Young | |
| 3,272,650 A | 9/1966 | MacVittie | |
| 3,297,086 A | 1/1967 | Spain | |
| 3,308,885 A | 3/1967 | Sandiford | |
| 3,316,965 A | 5/1967 | Watanabe | |
| 3,375,872 A | 4/1968 | McLaughlin et al. | |
| 3,404,735 A | 10/1968 | Young et al. | |
| 3,415,320 A | 12/1968 | Young | |
| 3,492,147 A | 1/1970 | Young et al. | |
| 3,659,651 A | 5/1972 | Graham | |
| 3,681,287 A | 8/1972 | Brown et al. | |
| 3,754,598 A | 8/1973 | Holloway, Jr. | |
| 3,765,804 A | 10/1973 | Brandon | |
| 3,768,564 A | 10/1973 | Knox et al. | |
| 3,784,585 A | 1/1974 | Schmitt et al. | |
| 3,819,525 A | 6/1974 | Hattenbrun | |
| 3,828,854 A | 8/1974 | Templeton et al. | |
| 3,842,911 A | 10/1974 | Know et al. | |
| 3,857,444 A | 12/1974 | Copeland | |
| 3,863,709 A | 2/1975 | Fitch | |
| 3,868,998 A | 3/1975 | Lybarger et al. | |
| 3,888,311 A | 6/1975 | Cooke, Jr. | |
| 3,912,692 A | 10/1975 | Casey et al. | 260/78.3 |
| 3,948,672 A | 4/1976 | Harnberger | |
| 3,955,993 A | 5/1976 | Curtice | |
| 3,960,736 A | 6/1976 | Free et al. | |
| 4,008,763 A | 2/1977 | Lowe et al. | |
| 4,029,148 A | 6/1977 | Emery | |
| 4,031,958 A | 6/1977 | Sandiford et al. | 166/270 |
| 4,042,032 A | 8/1977 | Anderson et al. | |
| 4,070,865 A | 1/1978 | McLaughlin | |
| 4,074,760 A | 2/1978 | Copeland et al. | |
| 4,127,173 A | 11/1978 | Watkins et al. | 166/276 |
| 4,169,798 A | 10/1979 | DeMartino | |
| 4,172,066 A | 10/1979 | Zweigle et al. | |
| 4,245,702 A | 1/1981 | Haafkens et al. | |
| 4,273,187 A | 6/1981 | Satter et al. | |
| 4,291,766 A | 9/1981 | Davies et al. | |
| 4,305,463 A | 12/1981 | Zakiewicz | |
| 4,336,842 A | 6/1982 | Graham et al. | |
| 4,352,674 A | 10/1982 | Fery | |
| 4,353,806 A | 10/1982 | Canter et al. | |
| 4,387,769 A | 6/1983 | Erbstoesser et al. | 166/295 |
| 4,415,805 A | 11/1983 | Fertl et al. | |
| 4,439,489 A | 3/1984 | Johnson et al. | |
| 4,443,347 A | 4/1984 | Underdown et al. | |
| 4,460,052 A | 7/1984 | Gockel | |
| 4,470,915 A | 9/1984 | Conway | |
| 4,493,875 A | 1/1985 | Beck et al. | |
| 4,494,605 A | 1/1985 | Wiechel et al. | |
| 4,498,995 A | 2/1985 | Gockel | |

(Continued)

FOREIGN PATENT DOCUMENTS

| | | |
|---|---|---|
| CA | 2063877 | 5/2003 |
| EP | 0313243 B1 | 10/1988 |
| EP | 0528595 A1 | 8/1992 |
| EP | 0510762 A2 | 11/1992 |
| EP | 0643196 A2 | 6/1994 |

(Continued)

OTHER PUBLICATIONS

Advances in Polymer Science, vol. 157 entitled "Degradable Aliphatic Polyesters" edited by A.-C. Albertsson. (undated).

(Continued)

*Primary Examiner*—George Suchfield
(74) *Attorney, Agent, or Firm*—Robert A. Kent; Baker Botts

(57) ABSTRACT

The present invention provides reduced-density coated particulates and methods for enhancing the transport of such particulates into well bores and fractures, and for enhancing the conductivity and permeability of subterranean formations using such particulates, and for sand control treatments using such particulates. The reduced-density, coated particulates of the present invention generally comprise particulate having a surface and a coating wherein the surface comprises a porous or partially hollow geometry and coating is capable of trapping a fluid between the particulate's surface and the coating.

60 Claims, No Drawings

U.S. PATENT DOCUMENTS

| | | |
|---|---|---|
| 4,501,328 A | 2/1985 | Nichols |
| 4,526,695 A | 7/1985 | Erbstoesser et al. |
| 4,527,627 A | 7/1985 | Graham et al. |
| 4,541,489 A | 9/1985 | Wu |
| 4,546,012 A | 10/1985 | Brooks |
| 4,553,596 A | 11/1985 | Graham et al. |
| 4,564,459 A | 1/1986 | Underdown et al. |
| 4,572,803 A | 2/1986 | Yamazoe et al. |
| 4,649,998 A | 3/1987 | Friedman |
| 4,664,819 A | 5/1987 | Glaze et al. |
| 4,665,988 A * | 5/1987 | Murphey et al. ............ 166/295 |
| 4,669,543 A | 6/1987 | Young |
| 4,675,140 A | 6/1987 | Sparks et al. |
| 4,683,954 A | 8/1987 | Walker et al. |
| 4,694,905 A | 9/1987 | Armbruster |
| 4,715,967 A | 12/1987 | Bellis |
| 4,716,964 A | 1/1988 | Erbstoesser et al. |
| 4,733,729 A | 3/1988 | Copeland |
| 4,739,832 A | 4/1988 | Jennings, Jr. et al. |
| 4,785,884 A | 11/1988 | Armbruster |
| 4,787,453 A | 11/1988 | Hewgill et al. |
| 4,789,105 A | 12/1988 | Hosokawa et al. |
| 4,796,701 A | 1/1989 | Hudson et al. |
| 4,797,262 A | 1/1989 | Dewitz |
| 4,800,960 A | 1/1989 | Friedman et al. |
| 4,809,783 A | 3/1989 | Hollenbeck et al. |
| 4,817,721 A | 4/1989 | Pober |
| 4,829,100 A | 5/1989 | Murphey et al. |
| 4,838,352 A | 6/1989 | Oberste-Padtberg et al. |
| 4,842,072 A | 6/1989 | Friedman et al. |
| 4,843,118 A | 6/1989 | Lai et al. |
| 4,848,467 A | 7/1989 | Cantu et al. |
| 4,848,470 A | 7/1989 | Korpics |
| 4,850,430 A | 7/1989 | Copeland et al. |
| 4,886,354 A | 12/1989 | Welch et al. |
| 4,888,240 A | 12/1989 | Graham et al. |
| 4,895,207 A | 1/1990 | Friedman et al. |
| 4,903,770 A | 2/1990 | Friedman et al. |
| 4,934,456 A | 6/1990 | Moradi-Araghi |
| 4,936,385 A | 6/1990 | Weaver et al. |
| 4,942,186 A | 7/1990 | Murphey et al. |
| 4,957,165 A | 9/1990 | Cantu et al. |
| 4,959,432 A | 9/1990 | Fan et al. |
| 4,961,466 A | 10/1990 | Himes et al. |
| 4,969,522 A | 11/1990 | Whitehurst et al. |
| 4,969,523 A | 11/1990 | Martin et al. |
| 4,986,353 A | 1/1991 | Clark et al. |
| 4,986,354 A | 1/1991 | Cantu et al. |
| 4,986,355 A | 1/1991 | Casad et al. |
| 5,030,603 A | 7/1991 | Rumpf et al. |
| 5,049,743 A | 9/1991 | Taylor, III et al. |
| 5,082,056 A | 1/1992 | Tackett, Jr. |
| 5,107,928 A | 4/1992 | Hilterhaus |
| 5,128,390 A | 7/1992 | Murphey et al. |
| 5,135,051 A | 8/1992 | Facteau et al. |
| 5,142,023 A | 8/1992 | Gruber et al. |
| 5,165,438 A | 11/1992 | Fracteau et al. |
| 5,173,527 A | 12/1992 | Calve |
| 5,182,051 A | 1/1993 | Bandy et al. |
| 5,199,491 A | 4/1993 | Kutts et al. |
| 5,199,492 A | 4/1993 | Suries et al. |
| 5,211,234 A | 5/1993 | Floyd |
| 5,216,050 A | 6/1993 | Sinclair ...................... 524/108 |
| 5,232,955 A | 8/1993 | Caabai et al. |
| 5,232,961 A | 8/1993 | Murphey et al. |
| 5,238,068 A | 8/1993 | Fredrickson |
| 5,247,059 A | 9/1993 | Gruber et al. |
| 5,249,628 A | 10/1993 | Surjaatmadja |
| 5,256,729 A | 10/1993 | Kutts et al. |
| 5,273,115 A | 12/1993 | Spafford |
| 5,285,849 A | 2/1994 | Surles et al. ................ 166/295 |
| 5,293,939 A | 3/1994 | Surles et al. |
| 5,295,542 A | 3/1994 | Cole et al. |
| 5,320,171 A | 6/1994 | Laramay |
| 5,321,062 A | 6/1994 | Landrum et al. |
| 5,325,923 A | 7/1994 | Surjaatmadja et al. |
| 5,330,005 A | 7/1994 | Card et al. |
| 5,332,037 A | 7/1994 | Schmidt et al. |
| 5,335,726 A | 8/1994 | Rodrogues |
| 5,351,754 A | 10/1994 | Hardin et al. |
| 5,358,051 A | 10/1994 | Rodrigues |
| 5,359,026 A | 10/1994 | Gruber |
| 5,360,068 A | 11/1994 | Sprunt et al. |
| 5,361,856 A | 11/1994 | Surjaatmajda et al. |
| 5,363,916 A | 11/1994 | Himes et al. |
| 5,373,901 A | 12/1994 | Norman et al. |
| 5,381,864 A | 1/1995 | Nguyen et al. |
| 5,386,874 A | 2/1995 | Laramay et al. |
| 5,388,648 A | 2/1995 | Jordan, Jr. |
| 5,393,810 A | 2/1995 | Harris et al. |
| 5,396,957 A | 3/1995 | Surjaatmadja et al. |
| 5,402,846 A | 4/1995 | Jennings, Jr. et al. |
| 5,422,183 A | 6/1995 | Sinclair et al. |
| 5,423,381 A | 6/1995 | Surles et al. |
| 5,439,055 A | 8/1995 | Card et al. |
| 5,460,226 A | 10/1995 | Lawton et al. |
| 5,464,060 A | 11/1995 | Hale et al. |
| 5,475,080 A | 12/1995 | Gruber et al. |
| 5,484,881 A | 1/1996 | Gruber et al. |
| 5,492,178 A | 2/1996 | Nguyen et al. |
| 5,494,103 A | 2/1996 | Surjaatmadja et al. |
| 5,497,830 A | 3/1996 | Boles et al. |
| 5,498,280 A | 3/1996 | Fistner et al. |
| 5,499,678 A | 3/1996 | Surjaatmadja et al. |
| 5,501,275 A | 3/1996 | Card et al. |
| 5,505,787 A | 4/1996 | Yamaguchi |
| 5,512,071 A | 4/1996 | Yam et al. |
| 5,522,460 A | 6/1996 | Shu |
| 5,529,123 A | 6/1996 | Carpenter et al. |
| 5,531,274 A | 7/1996 | Bienvenu, Jr. |
| 5,536,807 A | 7/1996 | Gruber et al. |
| 5,545,824 A | 8/1996 | Stengel et al. |
| 5,547,023 A | 8/1996 | McDaniel et al. |
| 5,551,513 A | 9/1996 | Suries et al. |
| 5,551,514 A | 9/1996 | Nelson et al. |
| 5,582,249 A | 12/1996 | Caveny et al. |
| 5,582,250 A | 12/1996 | Constein |
| 5,588,488 A | 12/1996 | Vijn et al. |
| 5,591,700 A | 1/1997 | Harris et al. |
| 5,594,095 A | 1/1997 | Gruber et al. |
| 5,595,245 A | 1/1997 | Scott, III |
| 5,597,784 A | 1/1997 | Sinclair et al. |
| 5,604,184 A | 2/1997 | Ellis et al. |
| 5,604,186 A | 2/1997 | Hunt et al. |
| 5,609,207 A | 3/1997 | Dewprashad et al. |
| 5,620,049 A | 4/1997 | Gipson et al. |
| 5,639,806 A | 6/1997 | Johnson et al. |
| 5,663,123 A * | 9/1997 | Goodhue et al. ............ 507/225 |
| 5,670,473 A | 9/1997 | Scepanski |
| 5,697,440 A | 12/1997 | Weaver et al. |
| 5,698,322 A | 12/1997 | Tsai et al. |
| 5,712,314 A | 1/1998 | Surles et al. |
| 5,732,364 A | 3/1998 | Kalb et al. |
| 5,765,642 A | 6/1998 | Surjaatmadja |
| 5,775,425 A | 7/1998 | Weaver et al. |
| 5,782,300 A | 7/1998 | James et al. |
| 5,783,822 A | 7/1998 | Buchanan et al. |
| 5,787,986 A | 8/1998 | Weaver et al. |
| 5,791,415 A | 8/1998 | Nguyen et al. |
| 5,799,734 A | 9/1998 | Norman et al. |
| 5,806,593 A | 9/1998 | Suries |
| 5,830,987 A | 11/1998 | Smith |
| 5,833,000 A | 11/1998 | Weaver et al. ............... 166/276 |
| 5,833,361 A | 11/1998 | Funk |

| | | | | | | |
|---|---|---|---|---|---|---|
| 5,836,391 A | 11/1998 | Jonasson et al. ............ 166/295 | 6,192,986 B1 | 2/2001 | Urlwin-Smith | |
| 5,836,392 A | 11/1998 | Urlwin-Smith | 6,196,317 B1 | 3/2001 | Hardy | |
| 5,837,656 A | 11/1998 | Sinclair et al. | 6,202,751 B1 | 3/2001 | Chatterji et al. | |
| 5,837,785 A | 11/1998 | Kinsho et al. | 6,209,643 B1 * | 4/2001 | Nguyen et al. ............ 166/276 | |
| 5,839,510 A | 11/1998 | Weaver et al. | 6,209,644 B1 | 4/2001 | Brunet | |
| 5,840,784 A | 11/1998 | Funkhouser et al. ........ 523/130 | 6,209,646 B1 | 4/2001 | Reddy et al. | |
| 5,849,401 A | 12/1998 | El-Afandi et al. | 6,210,471 B1 | 4/2001 | Craig | |
| 5,849,590 A | 12/1998 | Anderson, II et al. | 6,214,773 B1 | 4/2001 | Harris et al. | |
| 5,853,048 A | 12/1998 | Weaver et al. ............. 166/279 | 6,231,664 B1 | 5/2001 | Chatterji et al. | |
| 5,864,003 A | 1/1999 | Qureshi et al. | 6,234,251 B1 | 5/2001 | Chatterji et al. | |
| 5,865,936 A | 2/1999 | Edelman et al. | 6,238,597 B1 | 5/2001 | Yim et al. | |
| 5,871,049 A | 2/1999 | Weaver et al. | 6,241,019 B1 | 6/2001 | Davidson et al. | |
| 5,873,413 A | 2/1999 | Chatterji et al. | 6,242,390 B1 | 6/2001 | Mitchell et al. | |
| 5,875,844 A | 3/1999 | Chatterji et al. | 6,244,344 B1 | 6/2001 | Chatterji et al. | |
| 5,875,845 A | 3/1999 | Chatterji et al. | 6,257,335 B1 | 7/2001 | Nguyen et al. | |
| 5,875,846 A | 3/1999 | Chatterji et al. | 6,260,622 B1 | 7/2001 | Blok et al. | |
| 5,893,383 A | 4/1999 | Fracteau | 6,271,181 B1 | 8/2001 | Chatterji et al. | |
| 5,893,416 A | 4/1999 | Read | 6,274,650 B1 | 8/2001 | Cui | |
| 5,908,073 A | 6/1999 | Nguyen et al. | 6,279,652 B1 | 8/2001 | Chatterji et al. | |
| 5,911,282 A | 6/1999 | Onan et al. | 6,279,656 B1 | 8/2001 | Sinclair et al. | |
| 5,916,933 A | 6/1999 | Johnson et al. | 6,283,214 B1 | 9/2001 | Guinot et al. | |
| 5,921,317 A | 7/1999 | Dewprashad et al. | 6,302,207 B1 * | 10/2001 | Nguyen et al. ............ 166/276 | |
| 5,924,488 A | 7/1999 | Nguyen et al. | 6,306,998 B1 | 10/2001 | Kimura et al. | |
| 5,929,437 A | 7/1999 | Elliott et al. | 6,311,773 B1 | 11/2001 | Todd et al. ................. 166/280 | |
| 5,944,105 A | 8/1999 | Nguyen | 6,321,841 B1 | 11/2001 | Eoff et al. | |
| 5,945,387 A | 8/1999 | Chatterji et al. | 6,323,307 B1 | 11/2001 | Bigg et al. ................. 528/354 | |
| 5,957,204 A | 9/1999 | Chatterji et al. | 6,326,458 B1 | 12/2001 | Gruber et al. | |
| 5,960,877 A | 10/1999 | Funkhouser et al. ........ 166/270 | 6,328,105 B1 | 12/2001 | Betzold | |
| 5,960,880 A | 10/1999 | Nguyen et al. | 6,328,106 B1 | 12/2001 | Griffith et al. | |
| 5,964,291 A | 10/1999 | Bourne et al. | 6,330,916 B1 | 12/2001 | Rickards et al. | |
| 5,969,006 A | 10/1999 | Onan et al. | 6,330,917 B1 | 12/2001 | Chatterji et al. | |
| 5,977,283 A | 11/1999 | Rossitto | 6,350,309 B1 | 2/2002 | Chatterji et al. | |
| 5,994,785 A | 11/1999 | Higuchi et al. | 6,357,527 B1 | 3/2002 | Norman et al. | |
| RE36,466 E | 12/1999 | Nelson et al. | 6,364,018 B1 | 4/2002 | Brannon et al. | |
| 6,003,600 A | 12/1999 | Nguyen et al. | 6,364,945 B1 | 4/2002 | Chatterji et al. | |
| 6,004,400 A | 12/1999 | Bishop et al. | 6,367,165 B1 | 4/2002 | Huttlin | |
| 6,006,835 A | 12/1999 | Onan et al. | 6,367,549 B1 | 4/2002 | Chatterji et al. | |
| 6,006,836 A | 12/1999 | Chatterji et al. | 6,372,678 B1 | 4/2002 | Youngsman et al. | |
| 6,012,524 A | 1/2000 | Chatterji et al. | 6,376,571 B1 | 4/2002 | Chawla et al. | |
| 6,016,870 A | 1/2000 | Dewprashad et al. | 6,387,986 B1 | 5/2002 | Moradi-Araghi et al. | |
| 6,024,170 A | 2/2000 | McCabe et al. | 6,390,195 B1 | 5/2002 | Nguyen et al. | |
| 6,028,113 A | 2/2000 | Scepanski | 6,401,817 B1 | 6/2002 | Griffith et al. | |
| 6,028,534 A | 2/2000 | Ciglenec et al. | 6,405,797 B1 | 6/2002 | Davidson et al. | |
| 6,040,398 A | 3/2000 | Kinsho et al. | 6,406,789 B1 | 6/2002 | McDaniel et al. | |
| 6,047,772 A | 4/2000 | Weaver et al. | 6,408,943 B1 | 6/2002 | Schultz et al. | |
| 6,059,034 A | 5/2000 | Rickards et al. | 6,422,314 B1 | 7/2002 | Todd et al. | |
| 6,059,035 A | 5/2000 | Chatterji et al. | 6,439,309 B1 | 8/2002 | Matherly et al. | |
| 6,059,036 A | 5/2000 | Chatterji et al. | 6,439,310 B1 | 8/2002 | Scott, III et al. | |
| 6,068,055 A | 5/2000 | Chatterji et al. | 6,440,255 B1 | 8/2002 | Kohlhammer et al. | |
| 6,069,117 A | 5/2000 | Onan et al. | 6,446,727 B1 | 9/2002 | Zemlak et al. | |
| 6,074,739 A | 6/2000 | Katagiri | 6,448,206 B1 | 9/2002 | Griffith et al. | |
| 6,079,492 A * | 6/2000 | Hoogteijling et al. ........ 166/276 | 6,450,260 B1 | 9/2002 | James et al. | |
| 6,098,711 A | 8/2000 | Chatterji et al. | 6,454,003 B1 | 9/2002 | Chang et al. | |
| 6,114,410 A | 9/2000 | Betzold | 6,458,885 B1 | 10/2002 | Stengal et al. | |
| 6,123,871 A | 9/2000 | Carroll | 6,485,947 B1 | 11/2002 | Rajgarhia et al. | |
| 6,123,965 A | 9/2000 | Jacon et al. | 6,488,091 B1 | 12/2002 | Weaver et al. | |
| 6,124,246 A | 9/2000 | Heathman et al. | 6,488,763 B1 | 12/2002 | Brothers et al. | |
| 6,130,286 A | 10/2000 | Thomas et al. | 6,494,263 B1 | 12/2002 | Todd | |
| 6,135,987 A | 10/2000 | Tsai et al. | 6,503,870 B1 | 1/2003 | Griffith et al. | |
| 6,140,446 A | 10/2000 | Fujiki et al. | 6,508,305 B1 | 1/2003 | Brannon et al. | |
| 6,148,911 A | 11/2000 | Gipson et al. | 6,527,051 B1 | 3/2003 | Reddy et al. | |
| 6,152,234 A | 11/2000 | Newhouse et al. | 6,528,157 B1 | 3/2003 | Hussain et al. | |
| 6,162,766 A | 12/2000 | Muir et al. | 6,531,427 B1 | 3/2003 | Shuchart et al. | |
| 6,169,058 B1 | 1/2001 | Le et al. | 6,538,576 B1 | 3/2003 | Schultz et al. | |
| 6,172,011 B1 | 1/2001 | Card et al. | 6,543,545 B1 | 4/2003 | Chatterji et al. | |
| 6,172,077 B1 | 1/2001 | Curtis et al. | 6,552,333 B1 | 4/2003 | Storm et al. | |
| 6,176,315 B1 | 1/2001 | Reddy et al. | 6,554,071 B1 | 4/2003 | Reddy et al. | |
| 6,177,484 B1 | 1/2001 | Surles | 6,555,507 B1 | 4/2003 | Chatterji et al. | |
| 6,184,311 B1 | 2/2001 | O'Keefe et al. | 6,569,814 B1 | 5/2003 | Brady et al. | |
| 6,187,834 B1 | 2/2001 | Thayer et al. | 6,582,819 B1 | 6/2003 | McDaniel et al. | |
| 6,187,839 B1 | 2/2001 | Eoff et al. ................... 523/130 | 6,593,402 B1 | 7/2003 | Chatterji et al. | |
| 6,189,615 B1 | 2/2001 | Sydansk | 6,599,863 B1 | 7/2003 | Palmer et al. | |
| 6,192,985 B1 | 2/2001 | Hinkel et al. | 6,608,162 B1 | 8/2003 | Chiu et al. | |

| | | |
|---|---|---|
| 6,616,320 B1 | 9/2003 | Huber et al. |
| 6,620,857 B1 | 9/2003 | Valet |
| 6,626,241 B1 | 9/2003 | Nguyen |
| 6,632,527 B1 | 10/2003 | McDaniel et al. |
| 6,632,892 B1 | 10/2003 | Rubinsztajn et al. |
| 6,642,309 B1 | 11/2003 | Komitsu et al. |
| 6,648,501 B1 | 11/2003 | Huber et al. |
| 6,659,179 B1 | 12/2003 | Nguyen |
| 6,664,343 B1 | 12/2003 | Narisawa et al. |
| 6,667,279 B1 | 12/2003 | Hessert et al. |
| 6,668,926 B1 | 12/2003 | Nguyen et al. |
| 6,669,771 B1 | 12/2003 | Tokiwa et al. |
| 6,681,856 B1 | 1/2004 | Chatterji et al. |
| 6,686,328 B1 | 2/2004 | Binder |
| 6,705,400 B1 | 3/2004 | Nugyen et al. |
| 6,710,019 B1 | 3/2004 | Sawdon et al. |
| 6,713,170 B1 | 3/2004 | Kaneka et al. |
| 6,725,926 B1 | 4/2004 | Nguyen et al. |
| 6,725,931 B1 | 4/2004 | Nguyen et al. |
| 6,729,404 B1 | 5/2004 | Nguyen et al. |
| 6,732,800 B1 * | 5/2004 | Acock et al. ............... 166/295 |
| 6,745,159 B1 | 6/2004 | Todd et al. |
| 6,749,025 B1 | 6/2004 | Brannon et al. |
| 6,763,888 B1 | 7/2004 | Harris et al. |
| 6,766,858 B1 | 7/2004 | Nguyen et al. |
| 6,776,236 B1 | 8/2004 | Nguyen |
| 6,832,650 B1 | 12/2004 | Nguyen et al. |
| 6,851,474 B1 | 2/2005 | Nguyen |
| 6,978,836 B1 | 12/2005 | Nguyen et al. ............. 166/295 |
| 2001/0016562 A1 | 8/2001 | Muir et al. |
| 2002/0043370 A1 | 4/2002 | Poe |
| 2002/0070020 A1 | 6/2002 | Nguyen |
| 2003/0006036 A1 | 1/2003 | Malone et al. |
| 2003/0060374 A1 | 3/2003 | Cooke, Jr. |
| 2003/0114314 A1 | 6/2003 | Ballard et al. |
| 2003/0130133 A1 | 7/2003 | Vollmer |
| 2003/0131999 A1 | 7/2003 | Nguyen et al. |
| 2003/0148893 A1 | 8/2003 | Lungofer et al. |
| 2003/0186820 A1 | 10/2003 | Thesing |
| 2003/0188766 A1 | 10/2003 | Banerjee et al. |
| 2003/0188872 A1 | 10/2003 | Nguyen et al. |
| 2003/0196805 A1 | 10/2003 | Boney et al. |
| 2003/0205376 A1 | 11/2003 | Ayoub et al. |
| 2003/0230408 A1 | 12/2003 | Acock et al. |
| 2003/0234103 A1 | 12/2003 | Lee et al. |
| 2004/0000402 A1 | 1/2004 | Nguyen et al. |
| 2004/0014607 A1 | 1/2004 | Sinclair et al. |
| 2004/0014608 A1 | 1/2004 | Nguyen et al. |
| 2004/0040706 A1 | 3/2004 | Hossaini et al. |
| 2004/0040708 A1 | 3/2004 | Stephenson et al. |
| 2004/0048752 A1 | 3/2004 | Nguyen et al. |
| 2004/0055747 A1 | 3/2004 | Lee |
| 2004/0106525 A1 | 6/2004 | Willbert et al. |
| 2004/0138068 A1 | 7/2004 | Rimmer et al. |
| 2004/0149441 A1 | 8/2004 | Nguyen et al. |
| 2004/0152601 A1 | 8/2004 | Still et al. |
| 2004/0177961 A1 | 9/2004 | Nguyen et al. |
| 2004/0194961 A1 | 10/2004 | Nguyen et al. |
| 2004/0206499 A1 | 10/2004 | Nguyen et al. |
| 2004/0211559 A1 | 10/2004 | Nguyen et al. |
| 2004/0211561 A1 | 10/2004 | Nguyen et al. |
| 2004/0221992 A1 | 11/2004 | Nguyen et al. |
| 2004/0231845 A1 | 11/2004 | Cooke, Jr. |
| 2004/0231847 A1 | 11/2004 | Nguyen et al. |
| 2004/0256099 A1 | 12/2004 | Nguyen et al. |
| 2004/0261995 A1 | 12/2004 | Nguyen et al. |
| 2004/0261997 A1 | 12/2004 | Nguyen et al. |
| 2005/0006093 A1 | 1/2005 | Nguyen et al. |
| 2005/0006095 A1 * | 1/2005 | Justus et al. ............... 166/295 |
| 2005/0006096 A1 | 1/2005 | Nguyen et al. |
| 2005/0045326 A1 | 3/2005 | Nguyen |
| 2005/0123759 A1 * | 6/2005 | Weinberg et al. ........... 428/403 |

FOREIGN PATENT DOCUMENTS

| | | |
|---|---|---|
| EP | 0834644 A2 | 4/1998 |
| EP | 0853186 A2 | 7/1998 |
| EP | 0864726 A2 | 9/1998 |
| EP | 0879935 B1 | 11/1998 |
| EP | 0933498 A1 | 8/1999 |
| EP | 1001133 A1 | 5/2000 |
| EP | 1132569 A2 | 9/2001 |
| EP | 1326003 A1 | 7/2003 |
| EP | 1362978 A1 | 11/2003 |
| EP | 1394355 A1 | 3/2004 |
| EP | 1396606 A2 | 3/2004 |
| EP | 14003466 A2 | 3/2004 |
| EP | 1464789 A1 | 10/2004 |
| GB | 2382143 A | 4/2001 |
| WO | WO 93/15127 | 8/1993 |
| WO | WO 94/07949 | 4/1994 |
| WO | WO 94/08078 | 4/1994 |
| WO | WO 94/08090 | 4/1994 |
| WO | WO 95/09879 | 4/1995 |
| WO | WO 97/11845 | 4/1997 |
| WO | WO 99/27229 | 6/1999 |
| WO | WO 01/81914 | 11/2001 |
| WO | WO 01/87797 A1 | 11/2001 |
| WO | WO 02/12674 A1 | 2/2002 |
| WO | WO 03/027431 A1 | 4/2003 |
| WO | WO 04/037946 A1 | 5/2004 |
| WO | WO 04/038176 A1 | 5/2004 |

OTHER PUBLICATIONS

U.S. Appl. No. 10/383,154, filed Mar. 6, 2003, Nguyen et al.
U.S. Appl. No. 10/394,898, filed Mar. 21, 2003, Eoff et al.
U.S. Appl. No. 10/408,800, filed Apr. 7, 2003, Nguyen et al.
U.S. Appl. No. 10/601,407, filed Jun. 23, 2003, Byrd et al.
U.S. Appl. No. 10/603,492, filed Jun. 25, 2003, Nguyen et al.
U.S. Appl. No. 10/649,029, filed Aug. 27, 2003, Nguyen et al.
U.S. Appl. No. 10/650,063, filed Aug. 26, 2003, Nguyen.
U.S. Appl. No. 10/650,064, filed Aug. 26, 2003, Nguyen et al.
U.S. Appl. No. 10/650,065, filed Aug. 26, 2003, Nguyen.
U.S. Appl. No. 10/659,574, filed Sep. 10, 2003, Nguyen et al.
U.S. Appl. No. 10/727,365, filed Dec. 4, 2003, Reddy et al.
U.S. Appl. No. 10/751,593, filed Jan. 5, 2004, Nguyen.
U.S. Appl. No. 10/775,347, filed Feb. 10, 2004, Nguyen.
U.S. Appl. No. 10/791,944, filed Mar. 3, 2004, Nguyen.
U.S. Appl. No. 10/793,711, filed Mar. 5, 2004, Nguyen et al.
U.S. Appl. No. 10/852,811, filed May 25, 2004, Nguyen.
U.S. Appl. No. 10/853,879, filed May 26, 2004, Nguyen et al.
U.S. Appl. No. 10/860,951, filed Jun. 4, 2004, Stegent et al.
U.S. Appl. No. 10/861, 829, filed Jun. 4, 2004, Stegent et al.
U.S. Appl. No. 10/862,986, filed Jun. 8, 2004, Nguyen et al.
U.S. Appl. No. 10/864,061, filed Jun. 9, 2004, Blauch et al.
U.S. Appl. No. 10/864,618, filed Jun. 9, 2004, Blauch et al.
U.S. Appl. No. 10/868,593, filed Jun. 15, 2004, Nguyen et al.
U.S. Appl. No. 10/868,608, filed Jun. 15, 2004, Nguyen et al.
U.S. Appl. No. 10/937,076, filed Sep. 9, 2004, Nguyen et al.
U.S. Appl. No. 10/944,973, filed Sep. 20, 2004, Nguyen et al.
U.S. Appl. No. 10/972,648, filed Oct. 25, 2004, Dusterhoft et al.
U.S. Appl. No. 10/977,673, filed Oct. 29, 2004, Nguyen.

U.S. Appl. No. 11/009,277, filed Dec. 8, 2004, Welton et al.
U.S. Appl. No. 11/011,394, filed Dec. 12, 2004, Nguyen et al.
U.S. Appl. No. 11/035,833, filed Jan. 14, 2005, Nguyen.
U.S. Appl. No. 11/049,252, filed Feb. 2, 2005, Van Batenburg et al.
U.S. Appl. No. 11/053,280, filed Feb. 8, 2005, Nguyen.
U.S. Appl. No. 11/056, 635, filed Feb. 11, 2005, Dusterhoft et al.
Halliburton, *CoalStim<sup>SM</sup> Service, Helps Boost Cash Flow From CBM Assets*, Stimulation, HO3679 Oct. 3, 2003, Halliburton Communications.
Halliburton, *Conductivity Endurance Technology For High Permeability Reservoirs, Helps Prevent Intrusion of Formation Material Into the Proppant Pack for Improved Long-term Production*, Stimulation, 2003, Halliburton Communications.
Halliburton, *Expedite® Service, A Step-Change Improvement Over Conventional Proppant Flowback Control Systems. Provides Up to Three Times the Conductivity of RCPs.*, Stimulation, HO3296 May 4, 2004, Halliburton Communications.
Halliburton Technical Flier—Multi Stage Frac Completion Methods, 2 pages.
Halliburton "*CobraFrac<sup>SM</sup> Service, Coiled Tubing Fracturing—Cost-Effective Method for Stimulating Untapped Reserves*", 2 pages, 2004.
Halliburton "*CobraJetFrac<sup>SM</sup> Service, Cost-Effective Technology That Can Help Reduce Cost per BOE Produced, Shorten Cycle time and Reduce*".
Halliburton Cobra Frac Advertisement, 2001.
Halliburton "*SurgiFrac<sup>SM</sup> Service, a Quick and cost-Effective Method to Help Boost Production From Openhole Horizonal Completions*", 2002.
Halliburton, *SandWedge® NT Conductivity Enhancement System, Enhances Proppant Pack Conductivity and Helps Prevent Intrusion of Formation Material for Improved Long-Term Production*, Stimulation, HO2289 May 4, 2004, Halliburton Communications.
Nguyen et al., *A Novel Approach For Enhancing Proppant Consolidation: Laboratory Testing And Field Applications*, SPE Paper No. 77748, 2002.
SPE 15547, *Field Application of Lignosulfonate Gels To Reduce Channeling*, South Swan Hills Miscible Unit, Alberta, Canada, by O.R. Wagner et al., 1986.
Owens et al., *Waterflood Pressure Pulsing for Fractured Reservoirs* SPE 1123, 1966.
Felsenthal et al., *Pressure Pulsing—An Improved Method of Waterflooding Fractured Reservoirs* SPE 1788, 1957.
Raza, "*Water and Gas Cyclic Pulsing Method for Improved Oil Recovery*", SPE 3005, 1971.
Peng et al., "*Pressure Pulsing Waterflooding in Dual Porosity Naturally Fractured Reservoir*" SPE 17587, 1988.
Dusseault et al., "*Pressure Pulse Workovers in Heavy Oil*", SPE 79033, 2002.
Yang et al., "*Experimental Study on Fracture Initiation By Pressure Pulse*", SPE 63035, 2000.
Nguyen et al., *New Guidelines For Applying Curable Resin-Coated Proppants*, SPE Paper No. 39582, 1997.

Kazakov et al., "*Optimizing and Managing Coiled Tubing Frac Strings*" SPE 60747, 2000.
Gorman, *Plastic Electric: Lining up the Future of Conducting Polymers* Science News, vol. 163, May 17, 2003.
Gidley et al., "*Recent Advances in Hydraulic Fracturing*," Chapter 6, pp. 109-130, 1989.
Simmons et al., "*Poly(phenyllactide): Synthesis, Characterization, and Hydrolytic Degradation, Biomacromolecules*", vol. 2, No. 2, pp. 658-663, 2001.
Yin et al., "*Preparation and Characterization of Substituted Polylactides*", Americal Chemical Society, vol. 32, No. 23, pp. 7711-7718, 1999.
Yin et al., "*Synthesis and Properties of Polymers Derived from Substituted Lactic Acids*", American Chemical Society, Ch.12, pp. 147-159, 2001.
Cantu et al., "*Laboratory and Field Evaluation of a Combined Fluid-Loss Control Additive and Gel Breaker for Fracturing Fluids*," SPE 18211, 1990.
Love et al., "*Selectively Placing Many Fractures in Openhole Horizontal Wells Improves Production*", SPE 50422, 1998.
McDaniel et al. "*Evolving New Stimulation Process Proves Highly Effective in Level 1 Dual-Lateral Completion*" SPE 78697, 2002.
Albertsson et al.,"*Aliphatic Polyesters: Synthesis, Properties and Applications*", Advances in Polymer Science, vol. 57 Degradable Aliphatic Polyesters, 2002.
Dechy-Cabaret et al., "*Controlled Ring-Operated Polymerization of Lactide and Glycolide*" American Chemical Society, Chemical Reviews, A-Z, AA-AD, 2004.
Funkhouser et al., "*Synthetic Polymer Fracturing Fluid For High-Temperature Applications*", SPE 80236, 2003.
*Chelating Agents*, Encyclopedia of Chemical Technology, vol. 5 (764-795), (undated).
Vichaibun et al., "*A New Assay for the Enzymatic Degradation of Polylactic Acid, Short Report*", ScienceAsia, vol. 29, pp. 297-300, 2003.
CDX Gas, CDX Solution, 2003, CDX, LLC, Available @ www.cdxgas.com/solution.html, printed pp. 1-2, (undated).
CDX Gas, "*What is Coalbed Methane?*" CDX, LLC. Available @ www.cdxgas.com/what.html, printed p. 1, (undated).
Halliburton brochure entitled "H2Zero™ Service Introducing The Next Generation of cost-Effective Conformance Control Solutions", 2002.
Halliburton brochure entitled INJECTROL® A Component: 1999.
Halliburton brochure entitled "INJECTROL® G Sealant", 1999.
Halliburton brochure entitled "INJECTROL® IT Sealant", 1999.
Halliburton brochure entitled "INJECTROL® Service Treatment", 1999.
Halliburton brochure entitled "INJECTROL® U Sealant", 1999.
Halliburton brochure entitled "Sanfix® A Resin", 1999.
Halliburton brochure entitled "Pillar Frac Stimulation Technique" Fracturing Services Technical Data Sheet, 2 pages, undated.

* cited by examiner

REDUCED-DENSITY PROPPANTS AND METHODS OF USING REDUCED-DENSITY PROPPANTS TO ENHANCE THEIR TRANSPORT IN WELL BORES AND FRACTURES

FIELD OF THE INVENTION

The present invention involves improved particulates and methods for enhancing the transport of such particulates into well bores and fractures, and for enhancing the conductivity and permeability of subterranean formations using such particulates, and for sand control treatments using such particulates.

DESCRIPTION OF THE PRIOR ART

Particulate materials are often introduced into subterranean zones in conjunction with conductivity enhancing operations and sand control operations. Conductivity enhancing and sand control operations may be performed as individual treatments, or may be combined where desired.

A subterranean formation may be treated to increase its conductivity by hydraulically fracturing the formation to create one or more cracks or "fractures." Such hydraulic fracturing is usually accomplished by injecting a viscous fracturing fluid into the subterranean formation at a rate and pressure sufficient to cause the formation to break down and produce one or more fractures. The fracture or fractures may be horizontal or vertical, with the latter usually predominating, and with the tendency toward vertical fractures increasing with the depth of the formation being fractured. The fracturing fluid is generally a highly viscous gel, emulsion, or foam that comprises a particulate material often referred to as proppant. In some fracturing operations, commonly known as "water fracturing" operations, the fracturing fluid viscosity is somewhat lowered and yet the proppant remains in suspension because the fracturing fluid is injected into the formation at a substantially higher velocity. Whether a highly viscous fluid is used or a less viscous fluid with a higher velocity, proppant is deposited in the fracture and functions, inter alia, to hold the fracture open while maintaining conductive channels through which produced fluids can flow upon completion of the fracturing treatment and release of the attendant hydraulic pressure.

Sand control treatments are used, inter alia, to reduce the migration of unconsolidated formation particulates into the well bore. One such sand control treatment involves the use of a "gravel pack." While screen-less gravel packing operations are well known in the art, one common gravel packing operation involves placing a gravel pack screen in the well bore and packing the surrounding annulus between the screen and the well bore with particulates referred to as "gravel" that have a specific size designed to prevent the passage of formation sand. The gravel pack screen is generally a filter assembly used to support and retain the gravel placed during the gravel pack operation. A wide range of sizes and screen configurations are available to suit the characteristics of the well bore, the production fluid, and the unconsolidated particulates in the subterranean formation. Similarly, a wide range of sizes of particulate material suitable for use as the "gravel" is available to suit the characteristics of the well bore, the production fluid, and the unconsolidated particulates in the subterranean formation. The resulting structure presents a barrier to migrating sand from the formation while still permitting fluid flow. When installing the gravel pack, the gravel is carried to the formation in the form of a slurry by mixing the gravel with a highly viscous transport fluid. Once the gravel is placed in the well bore, the viscosity of the transport fluid is reduced and it is returned to the surface. Just as mentioned above with respect to fracturing operations, some gravel packing operations, commonly known as "high-rate water packing" operations, the transport fluid viscosity is somewhat lowered and yet the gravel remains in suspension because the treatment occurs at a substantially higher velocity. Gravel packs act, inter alia, to stabilize the formation while causing minimal impairment to well productivity. The gravel, inter alia, acts to prevent the particulates from occluding the screen or migrating with the produced fluids, and the screen, inter alia, acts to prevent the gravel from entering the production tubing.

Servicing fluids, be they fracturing fluids, gravel transport fluids, or some other fluid suitable for use in a subterranean formation, are commonly viscous, sometimes highly viscous. Often, a high viscosity servicing fluid is used so that it may carry suspended particulates into the formation. To achieve a viscosity high enough to suspend particulates, high concentrations of viscosifiers may be added to the servicing fluids. Such viscosifiers greatly increase the cost of the subterranean operations. Moreover, as such a fluid is used in a subterranean operation, a portion of the liquid contained in the fluid leaks off into the formation and creates an filter cake comprising deposited viscosifier on the walls of the fracture and/or the formation. While the filter cake may aid in preventing servicing fluids from being lost in the formation and in preventing solids from entering the porosities of the producing formation, the filter cake is generally undesirable when the subterranean formation is returned to production because the filter cake must be removed. Moreover, residue of viscosifiers used in subterranean applications often remains on the particulates transported in the viscosified fluid. Where such particulates are proppant particles used in a fracturing operation, such residue often reduces the conductivity of proppant packed fracture.

SUMMARY OF THE INVENTION

The present invention involves improved particulates and methods for enhancing the transport of such particulates into well bores and fractures, and for enhancing the conductivity and permeability of subterranean formations using such particulates, and for sand control treatments using such particulates.

One embodiment of the present invention provides a reduced-density, coated particulate comprising a particulate having a surface and a coating wherein the surface comprises a porous or partially hollow geometry and coating is capable of trapping a fluid between the particulate's surface and the coating.

Another embodiment of the present invention provides a method of treating a subterranean formation comprising the steps of providing a servicing fluid comprising a reduced-density particulate having a surface and a coating wherein the surface comprises a porous or partially hollow geometry and coating is capable of trapping a fluid between the particulate's surface and the coating; and, placing the servicing fluid into the subterranean formation.

Other and further objects, features and advantages of the present invention will be readily apparent to those skilled in the art upon a reading of the description of preferred embodiments which follows.

DESCRIPTION OF PREFERRED EMBODIMENTS

The present invention relates to improved particulates and methods for enhancing the transport of such particulates into well bores and fractures, and for enhancing the conductivity and permeability of subterranean formations using such particulates, and for sand control treatments using such particulates.

In preferred embodiments, the particulates of the present invention exhibit a surface geometry such that when the particulate is coated there exists at least one recessed or depressed area where a fluid, such as air, may be trapped between the coating and the particle surface. Such a particulate surface geometry is referred to herein as "porous or partially hollow." In the compositions and methods of the present invention, at least a portion of the surface area of a particulate is coated with a film of coating material that traps a fluid such as air between the surface of the particulate and the coating, thereby reducing the particulate's density. The coating need not cover 100% of the surface area of the particulate. Rather, it need only cover a portion of the particle necessary to trap at least one pocket of fluid such as air on the particle. In a preferred embodiment, enough air is trapped to beneficially effect the density of the particulate.

Any particulate having the potential surface geometry described above and suitable for use in subterranean applications is suitable for use as the proppant in the compositions and methods of the present invention. For instance, natural sand, quartz sand, particulate garnet, glass, ground walnut hulls, nylon pellets, bauxite, ceramics, polymeric materials, carbon composites, natural or synthetic polymers, porous silica, alumina spheroids, and resin beads are suitable. Suitable sizes range from 4 to 100 U.S. mesh, in certain preferred embodiments the sizes range from 10 to 60 US mesh. The proppant particles may be in any form, including that of regular or irregular pellets, fibers, flakes, ribbons, beads, shavings, platelets and the like.

The coating material may be a resin-type coating, a tackifying coating, or a degradable coating. When used to coat a particle, the coating material should have a sufficient viscosity such that the coating traps fluid such as air on the surface of the particulate rather than filling that area with the coating material. In preferred embodiments, this fluid should be in a recessed or depressed area of the particulate.

Where a resin-type coating material is used, it may be a curable resin. Resin-type coating materials may act not only to lower the density of the particulate, but also to aid in the consolidation of the resin-coated particulates. Such consolidation may be desirable to reduce proppant flow-back where the particulate is a proppant particle used in a fracturing operation. Suitable such resin-type coating materials include, but are not limited to, two-component epoxy-based resins, furan-based resins, phenolic-based resins, and a high-temperature (HT) epoxy-based resins.

Selection of a suitable resin-type coating material may be affected by the temperature of the subterranean formation to which the fluid will be introduced. By way of example, for subterranean formations having a bottom hole static temperature ("BHST") ranging from about 60° F. to about 250° F., two-component epoxy-based resins comprising a hardenable resin component and a hardening agent component comprising specific hardening agents may be preferred. For subterranean formations having a BHST ranging from about 300° F. to about 600° F., a furan-based resin may be preferred. For subterranean formations having a BHST ranging from about 200° F. to about 400° F., either a phenolic-based resin or a one-component HT epoxy-based resin may be suitable.

One resin-type coating material suitable for use in the proppant compositions of the present invention is a two-component epoxy based resin comprising a hardenable resin component and a hardening agent component. The hardenable resin component is comprised of a hardenable resin and an optional solvent. The solvent may be added to the resin to reduce its viscosity for ease of handling, mixing and transferring. It is within the ability of one skilled in the art with the benefit of this disclosure to determine if and how much solvent may be needed to achieve a viscosity suitable to the subterranean conditions. Factors that may affect this decision include geographic location of the well and the surrounding weather conditions. An alternate way to reduce the viscosity of the liquid hardenable resin is to heat it. This method avoids the use of a solvent altogether, which may be desirable in certain circumstances. The second component is the liquid hardening agent component, which is comprised of a hardening agent, a silane coupling agent, a surfactant, an optional hydrolyzable ester for, inter alia, breaking gelled fracturing fluid films on the proppant particles, and an optional liquid carrier fluid for, inter alia, reducing the viscosity of the liquid hardening agent component. It is within the ability of one skilled in the art with the benefit of this disclosure to determine if and how much liquid carrier fluid is needed to achieve a viscosity suitable to the subterranean conditions.

Examples of hardenable resins that can be utilized in the liquid hardenable resin component include, but are not limited to, organic resins such as bisphenol A-epichlorohydrin resin, polyepoxide resin, novolak resin, polyester resin, phenol-aldehyde resin, urea-aldehyde resin, furan resin, urethane resin, glycidyl ethers and mixtures thereof. Of these, bisphenol A-epichlorohydrin resin is preferred. The resin utilized is included in the liquid hardenable resin component in an amount sufficient to consolidate the coated particulates. In some embodiments of the present invention, the resin utilized is included in the liquid hardenable resin component in the range of from about 70% to about 100% by weight of the liquid hardenable resin component.

Any solvent that is compatible with the hardenable resin and achieves the desired viscosity effect is suitable for use in the present invention. Preferred solvents are those having high flash points (most preferably about 125° F.) because of, inter alia, environmental factors. As described above, use of a solvent in the hardenable resin composition is optional but may be desirable to reduce the viscosity of the hardenable resin component for a variety of reasons including ease of handling, mixing, and transferring. It is within the ability of one skilled in the art with the benefit of this disclosure to determine if and how much solvent is needed to achieve a suitable viscosity. Solvents suitable for use in the present invention include, but are not limited to, butylglycidyl ether, dipropylene glycol methyl ether, dipropylene glycol dimethyl ether, dimethyl formamide, diethyleneglycol methyl ether, ethyleneglycol butyl ether, diethyleneglycol butyl ether, propylene carbonate, methanol, butyl alcohol, d'limonene and fatty acid methyl esters. Of these, butylglucidyl ether is preferred.

Examples of the hardening agents that can be utilized in the liquid hardening agent component of the two-component consolidation fluids of the present invention include, but are not limited to, amines, aromatic amines, polyamines, aliphatic amines, cyclo-aliphatic amines, amides, polyamides, 2-ethyl-4-methyl imidazole and 1,1,3-trichlorotrifluoroacetone. Selection of a preferred hardening agent depends, in part, on the temperature of the formation in which the hardening agent will be used. By way of example and not of limitation, in subterranean formations having a temperature from about 60° F. to about 250° F., amines and cycloaliphatic amines such as piperidine, triethylamine, N,N-dimethylaminopyridine, benzyldimethylamine, tris(dimethylaminomethyl) phenol, and 2-($N_2$N-dimethylaminomethyl)phenol are preferred with N,N-dimethylaminopyridine most preferred. In subterranean formations having higher temperatures, 4,4'-diaminodiphenyl sulfone may be a suitable hardening agent. The hardening agent utilized is included in the liquid hardening agent component in an amount sufficient to consolidate the coated particulates. In some embodiments of the present invention, the hardening agent used is included in the liquid hardenable resin component in the range of from about 40% to about 60% by weight of the liquid hardening agent component.

The silane coupling agent may be used, inter alia, to act as a mediator to help bond the resin to the sand surface. Examples of silane coupling agents that can be utilized in the liquid hardening agent component of the two-component consolidation fluids of the present invention include, but are not limited to, N-2-(aminoethyl)-3-aminopropyltrimethoxysilane, 3-glycidoxypropyltrimethoxysilane, and n-beta-(aminoethyl)-gamma-aminopropyl trimethoxysilane. Of these, n-beta-(aminoethyl)-gamma-aminopropyl trimethoxysilane is preferred. The silane coupling agent used is included in the liquid hardening agent component in an amount capable of sufficiently bonding the resin to the particulate. In some embodiments of the present invention, the silane coupling agent used is included in the liquid hardenable resin component in the range of from about 0.1% to about 3% by weight of the liquid hardening agent component.

Any surfactant compatible with the liquid hardening agent may be used in the present invention. Such surfactants include, but are not limited to, an ethoxylated nonyl phenol phosphate ester, mixtures of one or more cationic surfactants, and one or more non-ionic surfactants and an alkyl phosphonate surfactant. The mixtures of one or more cationic and nonionic surfactants are described in U.S. Pat. No. 6,311,773, issued to Todd et al. on Nov. 6, 2001, which is incorporated herein by reference. A $C_{12}$–$C_{22}$ alkyl phosphonate surfactant is preferred. The surfactant or surfactants utilized are included in the liquid hardening agent component in an amount in the range of from about 2% to about 15% by weight of the liquid hardening agent component.

Use of a diluent or liquid carrier fluid in the hardenable resin composition is optional and may be used to reduce the viscosity of the hardenable resin component for ease of handling, mixing and transferring. It is within the ability of one skilled in the art, with the benefit of this disclosure, to determine if and how much liquid carrier fluid is needed to achieve a viscosity suitable to the subterranean conditions. Any suitable carrier fluid that is compatible with the hardenable resin and achieves the desired viscosity effects is suitable for use in the present invention. The liquid carrier fluids that can be utilized in the liquid hardening agent component of the two-component consolidation fluids of the present invention preferably include those having high flash points (most preferably above about 125° F.). Examples of liquid carrier fluids suitable for use in the present invention include, but are not limited to, dipropylene glycol methyl ether, dipropylene glycol dimethyl ether, dimethyl formamide, diethyleneglycol methyl ether, ethyleneglycol butyl ether, diethyleneglycol butyl ether, propylene carbonate, d'limonene and fatty acid methyl esters. Of these, dipropylene glycol methyl ether is preferred.

Where the resin-type coating material of the present invention is a furan-based resin, suitable furan-based resins include, but are not limited to, furfuryl alcohol, a mixture furfuryl alcohol with an aldehyde, and a mixture of furan resin and phenolic resin. Of these, furfuryl alcohol is preferred.

The furan-based resin may be combined with a solvent to control viscosity if desired. Suitable solvents for use in the furan-based consolidation fluids of the present invention include, but are not limited to 2-butoxy ethanol, butyl acetate, and furfuryl acetate. Of these, 2-butoxy ethanol is preferred.

Where the resin-type coating material of the present invention is a phenolic-based resin, suitable phenolic-based resins include, but are not limited to, terpolymers of phenol, phenolic formaldehyde resins, and a mixture of phenolic and furan resins. Of these, a mixture of phenolic and furan resins is preferred.

The phenolic-based resin may be combined with a solvent to control viscosity if desired. Suitable solvents for use in the phenolic-based consolidation fluids of the present invention include, but are not limited to butyl acetate, butyl lactate, furfuryl acetate, and 2-butoxy ethanol. Of these, 2-butoxy ethanol is preferred.

Where the resin-type coating material of the present invention is a HT epoxy-based resin, suitable HT epoxy-based components included, but are not limited to, bisphenol A-epichlorohydrin resin, polyepoxide resin, novolac resin, polyester resin, glycidyl ethers and mixtures thereof. Of these, bisphenol A-epichlorohydrin resin is preferred.

The HT epoxy-based resin may be combined with a solvent to control viscosity if desired. Suitable solvents for use with the HT epoxy-based resins of the present invention are those solvents capable of substantially dissolving the HT epoxy-resin chosen for use in the consolidation fluid. Such solvents include, but are not limited to, dimethyl sulfoxide and dimethyl formamide. A co-solvent such as dipropylene glycol methyl ether, dipropylene glycol dimethyl ether, dimethyl formamide, diethylene glycol methyl ether, ethylene glycol butyl ether, diethylene glycol butyl ether, propylene carbonate, d'limonene and fatty acid methyl esters, may also be used in combination with the solvent.

A tackifying coating may be used in the methods and compositions of the present invention. Tackifying coating materials act to lower the density of the particulate and may be coated onto the particulate far in advance of when it will be used without triggering a time-dependent degradation. That is, a particulate coated with a tackifying coating of the present invention may be stored for a substantial period of time before use without concern that the tackifying substance will cure and harden. Compounds suitable for use as a tackifying compound in the present invention comprise substantially any compound which, when in liquid form or in a solvent solution, will form a non-hardening coating upon a particulate. A particularly preferred group of tackifying compounds comprise polyamides, which are liquids or in solution at the temperature of the subterranean formation such that the polyamides are, by themselves, non-hardening when present on the particulates introduced into the subterranean formation. A particularly preferred product is a condensation reaction product comprised of commercially available polyacids and a polyamine. Such commercial products include compounds such as mixtures of $C_{36}$ dibasic acids containing some trimer and higher oligomers and also small amounts of monomer acids that are reacted with polyamines. Other polyacids include trimer acids, synthetic acids produced from fatty acids, maleic anhydride and acrylic acid and the like. Such acid compounds are commercially available from companies such as Witco Corporation, Union Camp, Chemtall, and Emery Industries. The reaction products are available from, for example, Champion Technologies, Inc. and Witco Corporation. Additional compounds which may be utilized as tackifying compounds include liquids and solutions of, for example, polyesters, polycarbonates and polycarbamates, natural resins such as shellac and the like. Suitable tackifying compounds are described in U.S. Pat. No. 5,853,048 issued to Weaver, et al. and U.S. Pat. No. 5,833,000 issued to Weaver, et al., the relevant disclosures of which are herein incorporated by reference.

Still another alternative type of coating suitable for use in the present invention is a degradable coating material. Degradable coating materials not only act to lower the density of the particulate, but the products of the degradation may be useful in the subterranean formation beyond their use in lowering the particulate's density. For example, when the products of the degradation are acids, they may be used to break the servicing fluid transporting the coated particulate or to degrade a filter cake neighboring the particulate. Any material that is capable of trapping a fluid such as air inside the vacant spaces of the proppant particle and then degrading over time may be suitable, so long as the material or the products of the degradation do not undesirably interfere with either the conductivity of a resultant particulate matrix or the production of any of the fluids from the subterranean formation.

Nonlimiting examples of degradable materials that may be used in conjunction with the present invention include but are not limited to degradable polymers. Such degradable materials are capable of undergoing an irreversible degradation downhole. The term "irreversible" as used herein means that the degradable material, once degraded downhole, should not recrystallize or reconsolidate while downhole, e.g., the degradable material should degrade in situ but should not recrystallize or reconsolidate in situ. The terms "degradation" or "degradable" refer to both the two relatively extreme cases of hydrolytic degradation that the degradable material may undergo, i.e., heterogeneous (or bulk erosion) and homogeneous (or surface erosion), and any stage of degradation in between these two. This degradation can be a result of, inter alia, a chemical or thermal reaction or a reaction induced by radiation.

The degradability of a polymer depends at least in part on its backbone structure. For instance, the presence of hydrolyzable and/or oxidizable linkages in the backbone often yields a material that will degrade as described herein. The rates at which such polymers degrade are dependent on the type of repetitive unit, composition, sequence, length, molecular geometry, molecular weight, morphology (e.g., crystallinity, size of spherulites, and orientation), hydrophilicity, hydrophobicity, surface area, and additives. Also, the environment to which the polymer is subjected may affect how it degrades, e.g., temperature, presence of moisture, oxygen, microorganisms, enzymes, pH, and the like.

Suitable examples of degradable polymers that may be used in accordance with the present invention include but are not limited to those described in the publication of Advances in Polymer Science, Vol. 157 entitled "Degradable Aliphatic Polyesters" edited by A.-C. Albertsson. Specific examples include homopolymers, random, block, graft, and star- and hyper-branched aliphatic polyesters. Polycondensation reactions, ring-opening polymerizations, free radical polymerizations, anionic polymerizations, carbocationic polymerizations, coordinative ring-opening polymerization, and any other suitable process may prepare such suitable polymers. Specific examples of suitable polymers include polysaccharides such as dextran or cellulose; chitins; chitosans; proteins; aliphatic polyesters; poly(lactides); poly(glycolides); poly(ε-caprolactones); poly(hydroxybutyrates); poly(anhydrides); aliphatic polycarbonates; poly(orthoesters); poly(amino acids); poly(ethylene oxides); and polyphosphazenes. Of these suitable polymers, aliphatic polyesters and polyanhydrides are preferred.

Aliphatic polyesters degrade chemically, inter alia, by hydrolytic cleavage. Hydrolysis can be catalyzed by either acids or bases. Generally, during the hydrolysis, carboxylic end groups are formed during chain scission, and this may enhance the rate of further hydrolysis. This mechanism is known in the art as "autocatalysis," and is thought to make polyester matrices more bulk eroding.

Suitable aliphatic polyesters have the general formula of repeating units shown below:

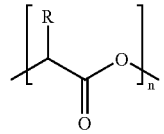

Formula I where n is an integer between 75 and 10,000 and R is selected from the group consisting of hydrogen, alkyl, aryl, alkylaryl, acetyl, heteroatoms, and mixtures thereof. Of the suitable aliphatic polyesters, poly(lactide) is preferred. Poly(lactide) is synthesized either from lactic acid by a condensation reaction or more commonly by ring-opening polymerization of cyclic lactide monomer. Since both lactic acid and lactide can achieve the same repeating unit, the general term poly(lactic acid) as used herein refers to formula I without any limitation as to how the polymer was made such as from lactides, lactic acid, or oligomers, and without reference to the degree of polymerization or level of plasticization.

The lactide monomer exists generally in three different forms: two stereoisomers L- and D-lactide and racemic D,L-lactide (meso-lactide). The oligomers of lactic acid, and oligomers of lactide are defined by the formula:

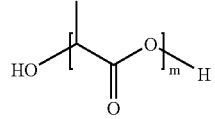

Formula II where m is an integer $2 \leq m \leq 75$. Preferably m is an integer and $2 \leq m \leq 10$. These limits correspond to number average molecular weights below about 5,400 and below about 720, respectively. The chirality of the lactide units provides a means to adjust, inter alia, degradation rates, as well as physical and mechanical properties. Poly(L-lactide), for instance, is a semicrystalline polymer with a relatively slow hydrolysis rate. This could be desirable in applications of the present invention where a slower degradation of the degradable particulate is desired. Poly(D,L-lactide) may be a more amorphous polymer with a resultant faster hydrolysis rate.

This may be suitable for other applications where a more rapid degradation may be appropriate. The stereoisomers of lactic acid may be used individually or combined to be used in accordance with the present invention. Additionally, they may be copolymerized with, for example, glycolide or other monomers like ε-caprolactone, 1,5-dioxepan-2-one, trimethylene carbonate, or other suitable monomers to obtain polymers with different properties or degradation times. Additionally, the lactic acid stereoisomers can be modified to be used in the present invention by, inter alia, blending, copolymerizing or otherwise mixing the stereoisomers, blending, copolymerizing or otherwise mixing high and low molecular weight polylactides, or by blending, copolymerizing or otherwise mixing a polylactide with another polyester or polyesters.

Plasticizers may be present in the polymeric degradable materials of the present invention. The plasticizers may be present in an amount sufficient to provide the desired characteristics, for example, (a) more effective compatibilization of the melt blend components, (b) improved processing characteristics during the blending and processing steps, and (c) control and regulation of the sensitivity and degradation of the polymer by moisture. Suitable plasticizers include but are not limited to derivatives of oligomeric lactic acid, selected from the group defined by the formula:

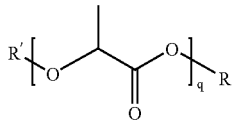

Formula III where R is a hydrogen, alkyl, aryl, alkylaryl, acetyl, heteroatom, or a mixture thereof and R is saturated, where R' is a hydrogen, alkyl, aryl, alkylaryl, acetyl, heteroatom, or a mixture thereof and R' is saturated, where R and R' cannot both be hydrogen, where q is an integer and $2 \leq q \leq 75$; and mixtures thereof. Preferably q is an integer and $2 \leq q \leq 10$. As used herein the term "derivatives of oligomeric lactic acid" includes derivatives of oligomeric lactide. In addition to the other qualities above, the plasticizers may enhance the degradation rate of the degradable polymeric materials. The plasticizers, if used, are preferably at least intimately incorporated within the degradable polymeric materials.

Aliphatic polyesters useful in the present invention may be prepared by substantially any of the conventionally known manufacturing methods such as those described in U.S. Pat. Nos. 6,323,307; 5,216,050; 4,387,769; 3,912,692; and 2,703,316, the relevant disclosures of which are incorporated herein by reference.

Polyanhydrides are another type of particularly suitable degradable polymer useful in the present invention. Polyanhydride hydrolysis proceeds, inter alia, via free carboxylic acid chain-ends to yield carboxylic acids as final degradation products. The erosion time can be varied over a broad range of changes in the polymer backbone. Examples of suitable polyanhydrides include poly(adipic anhydride), poly(suberic anhydride), poly(sebacic anhydride), and poly(dodecanedioic anhydride). Other suitable examples include but are not limited to poly(maleic anhydride) and poly(benzoic anhydride).

The physical properties of degradable polymers depend on several factors such as the composition of the repeat units, flexibility of the chain, presence of polar groups, molecular mass, degree of branching, crystallinity, orientation, etc. For example, short chain branches reduce the degree of crystallinity of polymers while long chain branches lower the melt viscosity and impart, inter alia, elongational viscosity with tension-stiffening behavior. The properties of the material utilized can be further tailored by blending, and copolymerizing it with another polymer, or by a change in the macromolecular architecture (e.g., hyperbranched polymers, star-shaped, or dendrimers, etc.). The properties of any such suitable degradable polymers (e.g., hydrophobicity, hydrophilicity, rate of degradation, etc.) can be tailored by introducing select functional groups along the polymer chains. For example, poly(phenyllactide) will degrade at about ⅕th of the rate of racemic poly(lactide) at a pH of 7.4 at 55° C. One of ordinary skill in the art with the benefit of this disclosure will be able to determine the appropriate degradable polymer to achieve the desired physical properties of the degradable polymers.

Blends of certain degradable materials may also be suitable. One example of a suitable blend of materials is a mixture of poly(lactic acid) and poly(glycolides). Other materials that undergo an irreversible degradation may also be suitable, if the products of the degradation do not undesirably interfere with either the conductivity of the particulate matrix or with the production of any of the fluids from the subterranean formation.

In choosing the appropriate degradable material, one should consider the degradation products that will result. These degradation products should not adversely affect other operations or components. The choice of degradable material also can depend, at least in part, on the conditions of the well, e.g., wellbore temperature. For instance, lactides have been found to be suitable for lower temperature wells, including those within the range of 60° F. to 150° F., and polylactides have been found to be suitable for well bore temperatures above this range. Also, poly(lactic acid) may be suitable for higher temperature wells. Some stereoisomers of poly(lactide) or mixtures of such stereoisomers may be suitable for even higher temperature applications. Dehydrated salts may also be suitable for higher temperature wells.

Also, we have found that a preferable result may be achieved if the degradable material degrades slowly over time as opposed to instantaneously. Even more preferable results have been obtained when the degradable material does not begin to degrade until after the particulate matrix has substantially developed. The slow degradation of the degradable material, inter alia, helps to maintain the stability of the proppant matrix.

Any fracturing or delivery fluid suitable for subterranean applications may be utilized in accordance with the present invention, including aqueous gels, emulsions, and other suitable fluids. The aqueous gels are generally comprised of water and one or more gelling agents. The emulsions are generally comprised of two immiscible liquids such as an aqueous gelled liquid and a liquefied, normally gaseous, fluid such as nitrogen. The fracturing or delivery fluid needs only to be viscous enough to substantially suspend the reduced-density particulate of the present invention. In most embodiments, highly viscous fluids, although suitable, are not necessary.

Therefore, the present invention is well adapted to carry out the objects and attain the ends and advantages mentioned as well as those that are inherent therein. While numerous changes may be made by those skilled in the art, such changes are encompassed within the spirit and scope of this invention as defined by the appended claims.

What is claimed is:

1. A method of treating a subterranean formation comprising:
   providing a servicing fluid comprising a particulate having a density, a surface, and a coating, wherein the surface comprises a porous or partially hollow geometry and the coating is capable of trapping a fluid between the surface and the coating;
   allowing a fluid to be trapped between the surface of particulate and the coating so that the density of the particulate is reduced; and
   introducing the servicing fluid into the subterranean formation.

2. The method of claim 1 wherein the coating comprises a resin-type coating material.

3. The method of claim 2 wherein the resin-type coating material is a consolidation fluid comprising a hardenable resin component comprising a hardenable resin and a hardening agent component comprising a liquid hardening agent, a silane coupling agent, and a surfactant.

4. The method of claim 3 wherein the hardenable resin in the liquid hardenable resin component is an organic resin selected from the group consisting of bisphenol A-epichlorohydrin resin, polyepoxide resin, novolak resin, polyester resin, phenol-aldehyde resin, urea-aldehyde resin, furan resin, urethane resin, glycidyl ethers, and mixtures thereof.

5. The method of claim 3 wherein the liquid hardening agent in the liquid hardening agent component is selected from the group consisting of amines, aromatic amines, aliphatic amines, cyclo-aliphatic amines, piperidine, triethylamine, benzyldimethylamine, N,N-dimethylaminopyridine, 2-($N_2$N-dimethylaminomethyl)phenol, tris(dimethylaminomethyl)phenol, and mixtures thereof.

6. The method of claim 3 wherein the silane coupling agent in the liquid hardening agent component is selected from the group consisting of N-2-(aminoethyl)-3-aminopropyltrimethoxysilane, 3-glycidoxypropyltrimethoxysilane, n-beta-(aminoethyl)-gamma-aminopropyl trimethoxysilane and mixtures thereof.

7. The method of claim 3 wherein the surfactant in the liquid hardening agent component is selected from the group consisting of ethoxylated nonyl phenol phosphate esters, mixtures of one or more cationic surfactants, $C_{12}$–$C_{22}$ alkyl phosphonate surfactants, one or more non-ionic surfactants and alkyl phosphonate surfactants, and mixtures thereof.

8. The method of claim 2 wherein the resin-type coating material is a furan-based resin selected from the group consisting of furfuryl alcohol, a mixture furfuryl alcohol with an aldehyde, a mixture of furan resin and phenolic resin and mixtures thereof.

9. The method of claim 8 further comprising a solvent selected from the group consisting of 2-butoxy ethanol, butyl acetate, furfuryl acetate, and mixtures thereof.

10. The method of claim 2 wherein the resin-type coating material is a phenolic-based resin selected from the group consisting of terpolymer of phenol, phenolic formaldehyde resin, a mixture of phenolic and furan resin, and mixtures thereof.

11. The method of claim 10 further comprising a solvent selected from the group consisting of butyl acetate, butyl lactate, furfuryl acetate, 2-butoxy ethanol, and mixtures thereof.

12. The method of claim 2 wherein the resin-type coating material is a HT epoxy-based resin selected from the group consisting of bisphenol A-epichlorohydrin resin, polyepoxide resin, novolac resin, polyester resin, glycidyl ethers, and mixtures thereof.

13. The method of claim 12 further comprising a solvent selected from the group consisting of dimethyl sulfoxide, dimethyl formamide, dipropylene glycol methyl ether, dipropylene glycol dimethyl ether, dimethyl formamide, diethylene glycol methyl ether, ethylene glycol butyl ether, diethylene glycol butyl ether, propylene carbonate, d-limonene, fatty acid methyl esters, and mixtures thereof.

14. The method of claim 1 wherein the coating comprises a tackifying coating material.

15. The method of claim 14 wherein the tackifying coating material is selected from the group consisting of polyamides, polyesters, polycarbonates, polycarbamates, natural resins, and combinations thereof.

16. The method of claim 1 wherein the coating comprises a degradable coating material.

17. The method of claim 16 wherein the degradable coating material comprises a degradable polymer.

18. The method of claim 17 wherein the degradable coating material is selected from the group consisting of polysaccharides, chitins, chitosans, proteins, aliphatic polyesters, poly(lactides), poly(glycolides), poly($\epsilon$-caprolactones), poly(hydroxybutyrates), poly(anhydrides), aliphatic polycarbonates, poly(orthoesters), poly(amino acids), poly(ethylene oxides), polyphosphazenes, and combinations thereof.

19. The method of claim 17 wherein the degradable coating material comprises a stereoisomer of poly(lactide).

20. The method of claim 17 wherein the degradable coating material comprises a plasticizer.

21. A method of fracturing a subterranean formation comprising:
   providing a fracturing fluid comprising at least a plurality of particulates having a density, a surface, and a coating, wherein the surface comprises a porous or partially hollow geometry and the coating is capable of trapping a fluid between the surface and the coating;
   allowing a fluid to be trapped between the surface of particulate and the coating so that the density of the particulate is reduced;
   introducing the fracturing fluid into the subterranean formation at a pressure sufficient to create or enhance at least one fracture therein; and
   removing the fracturing fluid while leaving at least one of the particulates in the fracture.

22. The method of claim 21 wherein the coating comprises a resin-type coating material.

23. The method of claim 22 wherein the resin-type coating material is a consolidation fluid comprising a hardenable resin component comprising a hardenable resin and a hardening agent component comprising a liquid hardening agent, a silane coupling agent, and a surfactant.

24. The method of claim 23 wherein the hardenable resin in the liquid hardenable resin component is an organic resin selected from the group consisting of bisphenol A-epichlorohydrin resin, polyepoxide resin, novolak resin, polyester resin, phenol-aldehyde resin, urea-aldehyde resin, furan resin, urethane resin, glycidyl ethers, and mixtures thereof.

25. The method of claim 23 wherein the liquid hardening agent in the liquid hardening agent component is selected from the group consisting of amines, aromatic amines, aliphatic amines, cyclo-aliphatic amines, piperidine, triethylamine, benzyldimethylamine, N,N-dimethylaminopyridine, 2-($N_2$N-dimethylaminomethyl)phenol, tris(dimethylaminomethyl)phenol, and mixtures thereof.

26. The method of claim 23 wherein the silane coupling agent in the liquid hardening agent component is selected from the group consisting of N-2-(aminoethyl)-3-aminopropyltrimethoxysilane, 3-glycidoxypropyltrimethoxysilane, n-beta-(aminoethyl)-gamma-aminopropyl trimethoxysilane and mixtures thereof.

27. The method of claim 23 wherein the surfactant in the liquid hardening agent component is selected from the group consisting of ethoxylated nonyl phenol phosphate esters, mixtures of one or more cationic surfactants, $C_{12}$–$C_{22}$ alkyl phosphonate surfactants, one or more non-ionic surfactants and an alkyl phosphonate surfactant, and mixtures thereof.

28. The method of claim 23 wherein the resin-type coating material is a furan-based resin selected from the group consisting of furfuryl alcohols, mixtures of furfuryl alcohol with an aldehyde, mixtures of furan resin and phenolic resin and mixtures thereof.

29. The method of claim 23 further comprising a solvent selected from the group consisting of 2-butoxy ethanol, butyl acetate, furfuryl acetate, and mixtures thereof.

30. The method of claim 23 wherein the resin-type coating material is a phenolic-based resin selected from the group consisting of terpolymer of phenol, phenolic formaldehyde resin, a mixture of phenolic and furan resin, and mixtures thereof.

31. The method of claim 30 further comprising a solvent wherein the solvent is selected from the group consisting of butyl acetate, butyl lactate, furfuryl acetate, 2-butoxy ethanol, and mixtures thereof.

32. The method of claim 22 wherein the resin-type coating material is a HT epoxy-based resin selected from the group consisting of bisphenol A-epichlorohydrin resin, polyepoxide resin, novolac resin, polyester resin, glycidyl ethers, and mixtures thereof.

33. The method of claim 21 further comprising a solvent selected from the group consisting of dimethyl sulfoxide, dimethyl formamide, dipropylene glycol methyl ether, dipropylene glycol dimethyl ether, dimethyl formamide, diethylene glycol methyl ether, ethylene glycol butyl ether, diethylene glycol butyl ether, propylene carbonate, d-limonene, fatty acid methyl esters, and mixtures thereof.

34. The method of claim 21 wherein the coating comprises a tackifying coating material.

35. The method of claim 34 wherein the tackifying coating material is selected from the group consisting of polyamides, polyesters, polycarbonates, polycarbamates, natural resins, and combinations thereof.

36. The method of claim 21 wherein the coating comprises a degradable coating material.

37. The method of claim 36 wherein the degradable coating material comprises a degradable polymer.

38. The method of claim 37 wherein the degradable coating material is selected from the group consisting of polysaccharides, chitins, chitosans, proteins, aliphatic polyesters, poly(lactides), poly(glycolides), poly(ε-caprolactones), poly(hydroxybutyrates), poly(anhydrides), aliphatic polycarbonates, poly(orthoesters), poly(amino acids), poly(ethylene oxides), polyphosphazenes, and combinations thereof.

39. The method of claim 37 wherein the degradable coating material comprises a stereoisomer of poly(lactide).

40. The method of claim 37 wherein the degradable coating material comprises a plasticizer.

41. A method of installing a gravel pack comprising:
providing a gravel packing fluid comprising at least a plurality of particulates having a density, a surface, and a coating, wherein the surface comprises a porous or partially hollow geometry and the coating is capable of trapping a fluid between the surface and the coating;
allowing a fluid to be trapped between the surface of particulate and the coating so that the density of the particulate is reduced; and
introducing the gravel packing fluid into a well bore so that the a gravel pack that comprises at least one of the particulates is formed substantially adjacent to the well bore.

42. The method of claim 41 wherein the coating comprises a resin-type coating material.

43. The method of claim 42 wherein the resin-type coating material is a consolidation fluid comprising a hardenable resin component comprising a hardenable resin and a hardening agent component comprising a liquid hardening agent, a silane coupling agent, and a surfactant.

44. The method of claim 43 wherein the hardenable resin in the liquid hardenable resin component is an organic resin selected from the group consisting of bisphenol A-epichlorohydrin resin, polyepoxide resin, novolak resin, polyester resin, phenol-aldehyde resin, urea-aldehyde resin, furan resin, urethane resin, glycidyl ethers, and mixtures thereof.

45. The method of claim 43 wherein the liquid hardening agent in the liquid hardening agent component is selected from the group consisting of amines, aromatic amines, aliphatic amines, cyclo-aliphatic amines, piperidine, triethylamine, benzyldimethylamine, N,N-dimethylaminopyridine, 2-($N_2$N-dimethylaminomethyl)phenol, tris(dimethylaminomethyl)phenol, and mixtures thereof.

46. The method of claim 43 wherein the silane coupling agent in the liquid hardening agent component is selected from the group consisting of N-2-(aminoethyl)-3-aminopropyltrimethoxysilane, 3-glycidoxypropyltrimethoxysilane, n-beta-(aminoethyl)-gamma-aminopropyl trimethoxysilane and mixtures thereof.

47. The method of claim 43 wherein the surfactant in the liquid hardening agent component is selected from the group consisting of ethoxylated nonyl phenol phosphate esters, mixtures of one or more cationic surfactants, $C_{12}$–$C_{22}$ alkyl phosphonate surfactants, one or more non-ionic surfactants and alkyl phosphonate surfactants, and mixtures thereof.

48. The method of claim 42 wherein the resin-type coating material is a furan-based resin selected from the group consisting of furfuryl alcohols, mixtures of furfuryl alcohol with an aldehyde, mixtures of furan resin and phenolic resin and mixtures thereof.

49. The method of claim 48 further comprising a solvent selected from the group consisting of 2-butoxy ethanol, butyl acetate, furfuryl acetate, and mixtures thereof.

50. The method of claim 42 wherein the resin-type coating material is a phenolic-based resin selected from the group consisting of terpolymers of phenol, phenolic formaldehyde resin, mixtures of phenolic and furan resin, and mixtures thereof.

51. The method of claim 50 further comprising a solvent selected from the group consisting of butyl acetate, butyl lactate, furfuryl acetate, 2-butoxy ethanol, and mixtures thereof.

52. The method of claim 42 wherein the resin-type coating material is a HT epoxy-based resin selected from the group consisting of bisphenol A-epichlorohydrin resin, polyepoxide resin, novolac resin, polyester resin, glycidyl ethers, and mixtures thereof.

53. The method of claim 52 further comprising a solvent selected from the group consisting of dimethyl sulfoxide, dimethyl formamide, dipropylene glycol methyl ether, dipropylene glycol dimethyl ether, dimethyl formamide, diethylene glycol methyl ether, ethylene glycol butyl ether, diethylene glycol butyl ether, propylene carbonate, d-limonene, fatty acid methyl esters, and mixtures thereof.

54. The method of claim 41 wherein the coating comprises a tackifying coating material.

55. The method of claim 54 wherein the tackifying coating material is selected from the group consisting of polyamides, polyesters, polycarbonates, polycarbamates, natural resins, and combinations thereof.

56. The method of claim 41 wherein the coating comprises a degradable coating material.

57. The method of claim 56 wherein the degradable coating material comprises a degradable polymer.

58. The method of claim 57 wherein the degradable coating material is selected from the group consisting of polysaccharides, chitins, chitosans, proteins, aliphatic polyesters, poly(lactides), poly(glycolides), poly($\epsilon$-caprolactones), poly(hydroxybutyrates), poly(anhydrides), aliphatic polycarbonates, poly(orthoesters), poly(amino acids), poly(ethylene oxides), polyphosphazenes, and combinations thereof.

59. The method of claim 57 wherein the degradable coating material comprises a stereoisomer of poly(lactide).

60. The method of claim 57 wherein the degradable coating material comprises a plasticizer.

* * * * *